(12) United States Patent
Benakli et al.

(10) Patent No.: US 7,880,999 B2
(45) Date of Patent: Feb. 1, 2011

(54) MAGNETIC STORAGE SYSTEM WITH READ DURING WRITE

(75) Inventors: Mourad Benakli, Bloomington, MN (US); Michael L. Mallary, Harmony, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 215 days.

(21) Appl. No.: 12/205,061

(22) Filed: Sep. 5, 2008

(65) Prior Publication Data

US 2010/0061019 A1  Mar. 11, 2010

(51) Int. Cl.
G11B 5/03  (2006.01)
G11B 5/33  (2006.01)
G11B 5/127  (2006.01)

(52) U.S. Cl. .......................... 360/66; 360/324
(58) Field of Classification Search .................. None
See application file for complete search history.

(56) References Cited

U.S. PATENT DOCUMENTS

| | | | |
|---|---|---|---|
| 5,550,685 A | 8/1996 | Drouin | 360/77.08 |
| 5,923,491 A | 7/1999 | Kisaka et al. | 360/77.04 |
| 5,978,169 A | 11/1999 | Woods | 360/77.04 |
| 6,069,764 A | 5/2000 | Morris et al. | 360/77.04 |
| 6,115,203 A | 9/2000 | Ho et al. | 360/77.04 |
| 6,292,324 B1 | 9/2001 | Ho et al. | 360/77.04 |
| 6,310,742 B1 | 10/2001 | Nazarian et al. | 360/77.04 |
| 6,377,417 B1 | 4/2002 | Ahn | 360/77.04 |
| 6,545,835 B1 | 4/2003 | Codilian et al. | 360/77.04 |
| 6,549,362 B1 | 4/2003 | Melrose et al. | 360/77.04 |
| 6,563,663 B1 | 5/2003 | Bi et al. | 360/77.04 |
| 6,654,197 B1 | 11/2003 | Ho | 360/77.04 |
| 6,798,624 B2 * | 9/2004 | Covington et al. | 360/324.1 |
| 6,847,503 B2 | 1/2005 | Zhang et al. | 360/77.04 |
| 6,950,273 B2 | 9/2005 | Nakagawa et al. | 360/78.14 |
| 6,995,950 B2 * | 2/2006 | Lairson et al. | 360/125.3 |
| 7,292,414 B1 * | 11/2007 | Mallary | 360/324 |
| 7,330,331 B2 | 2/2008 | Zhang | 360/77.01 |
| 7,397,622 B1 * | 7/2008 | Liikanen et al. | 360/66 |
| 2001/0036033 A1 | 11/2001 | Baumann et al. | 360/77.08 |
| 2001/0038507 A1 | 11/2001 | Szita | 360/75 |
| 2001/0048570 A1 | 12/2001 | AbouJaoude et al. | 360/77.04 |
| 2002/0039248 A1 | 4/2002 | Liu et al. | 360/77.04 |
| 2007/0242392 A1 * | 10/2007 | Benakli | 360/319 |
| 2009/0002868 A1 * | 1/2009 | Mallary et al. | 360/55 |

OTHER PUBLICATIONS

*Encyclopedia of Physical Science and Technology, Second Edition*, vol. 10, Robert A. Meyers, Editor, pp. 620-624, 1992.
*Encyclopedia of Physical Science and Technology, Second Edition*, vol. 4, Robert A. Meyers, Editor, pp. 457-461, 1992.

* cited by examiner

*Primary Examiner*—Daniell L Negrón
*Assistant Examiner*—Regina N Holder
(74) *Attorney, Agent, or Firm*—Alan G. Rego; Westman, Champlin & Kelly, P.A.

(57) ABSTRACT

A magnetic storage system includes a magnetic storage medium and a transducer positioned adjacent the magnetic storage medium. The transducer has a reader positioned adjacent writer and a reader bias coil located on the transducer. Transducer circuitry is configured to apply a bias signal to the reader bias coil during a read-write operation. The reader bias coil generates a reader bias field proximate the reader.

20 Claims, 7 Drawing Sheets

US 7,880,999 B2

MAGNETIC STORAGE SYSTEM WITH READ DURING WRITE

BACKGROUND OF THE INVENTION

The present invention relates to magnetic storage systems. More specifically, the present invention relates to performing reading during writing of data in a magnetic storage system.

Magnetic storage systems are used for storing information. Various techniques have been employed in order to increase the amount of information which can be stored for a given area or volume. One technique which is being employed is referred to as bit patterned media (BPM). With this technique, various bit locations are patterned onto the storage medium. In such a system, in some configurations it may be desirable to be able to read data simultaneously with a writing operation. In a BPM system, a magnetic transducer is used for reading and writing data. In order to efficiently read data during a writing operation, it is desirable for the read sensor of the transducer to be in close proximity to the write pole tip. However, this proximity induces cross talk between the write signal and the data being read back from the storage media. Example solutions for addressing this cross talk include providing additional shielding, increasing the spacing between the read and write transducers, decreasing the write signal, or attempting to increase the read signal. Embodiments of the present invention provide solutions to these and other problems, and offer other advantages over the prior art.

SUMMARY OF THE INVENTION

A magnetic storage system includes a magnetic storage medium and a transducer which is positioned adjacent the magnetic storage medium. The transducer has a reader adjacent writer, and a reader bias coil. Transducer circuitry is configured to apply a bias signal to the reader bias coil during a read-write operation.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
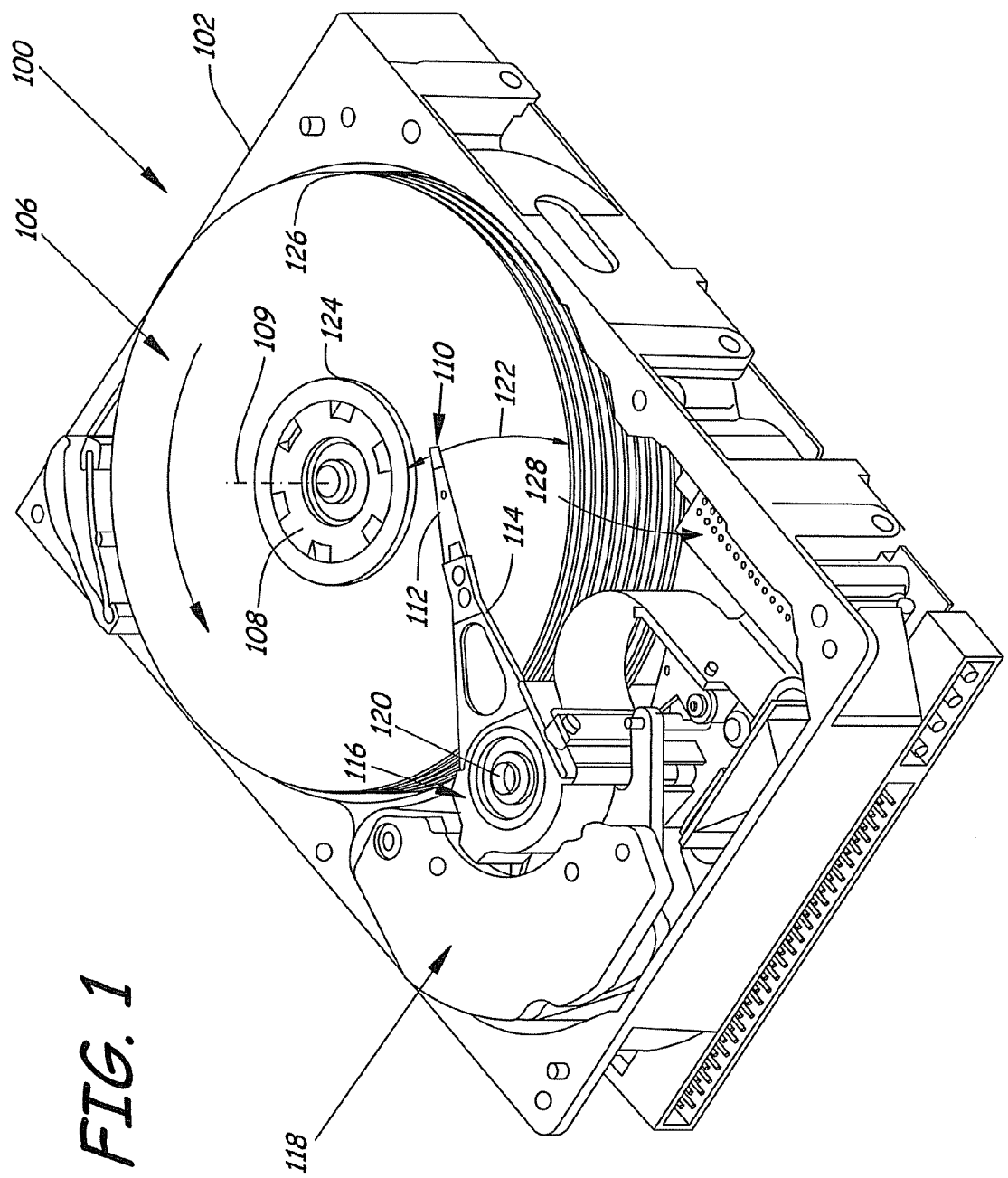
FIG. 1 is a perspective view of a disc drive.

Referring now to FIG. 1, a perspective view of a disc drive 100 with which the present invention is useful is shown. The same reference numerals are used in the various figures to represent the same or similar elements. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs which are mounted for co-rotation about central axis 109.

Each disc surface has an associated slider 110 which is mounted in disc drive 100 and carries a read/write head for communication with the disc surface. In the example shown in FIG. 1, sliders 110 are supported by suspensions 112 which are in turn supported by track accessing arms 114 of an actuator 116. The actuator shown in FIG. 1 is of the type known as a rotary moving coil actuator and includes a voice coil motor (VCM), shown generally at 118. Other types of actuators can be used, such as linear actuators.

Voice coil motor 118 rotates actuator 116 with its attached sliders 110 about a pivot shaft 120 to position sliders 110 over a desired data track along a path 122 between a disc inner diameter 124 and a disc outer diameter 126. Voice coil motor 118 operates under the control of a closed-loop servo controller within internal circuitry 128 based on position information, which is stored on one or more of the disc surfaces within dedicated servo fields. The servo fields can be interleaved with data sectors on each disc surface or can be located on a single disc surface that is dedicated to storing servo information. As slider 110 passes over the servo fields, the read/write head generates a readback signal, which in turn is used to generate position error signals (PES) that identify the location of the head relative to the center line of the desired track. Based on the PES, actuator 116 moves suspension 112 to adjust the head's position so that it moves toward the desired position. Once the transducing head is appropriately positioned, servo controller 128 then executes a desired read or write operation.

One recording technique is referred to as bit patterned media (BPM) recording in which the location of bits is specifically patterned on the media surface. In such a configuration, in some embodiments, it is desirable to perform a reading operation while writing data. In order to efficiently perform a read operation while writing data, it is desirable to position the read sensor to be in close proximity to the write pole tip. However, this close proximity between the reader and the writer can cause magnetic coupling therebetween (i.e., cross talk). This cross talk can drive the read sensor into saturation thereby making it impossible to perform a read operation. The present invention provides a method and apparatus for addressing this cross talk by applying a bias magnetic field proximate the read sensor to counteract the magnetic write field from the writer.

Figure 2:
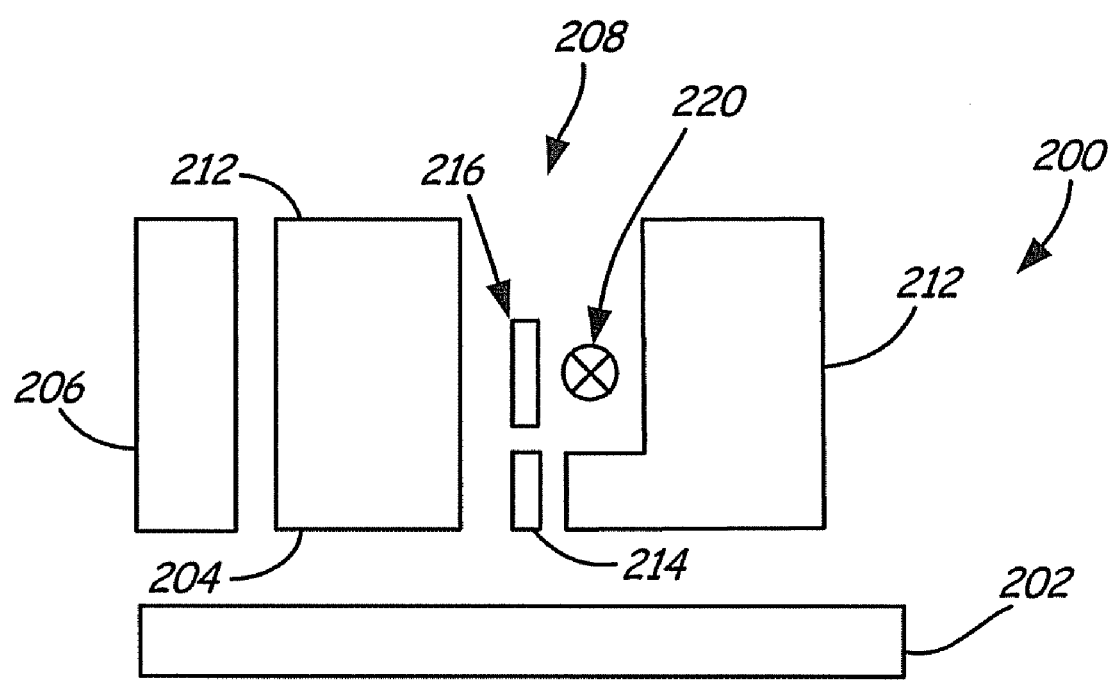
FIG. 2 is a simplified block diagram including a bias coil in accordance with one example embodiment of the present invention.

FIG. 2 is a simplified side view of a slider (transducer head) 200 shown positioned adjacent media 202. Slider 200 includes an air bearing surface 204 which presents a write 206 and a read sensor 208 to the surface of media 202. Reader 208 is positioned between read shields 212 and includes a magnetoresistive free layer 214 and a flux pipe 216 for efficient coupling to the free layer 214. A bias coil 220 is positioned proximate the read sensor 208 and is configured to generate a bias magnetic field waveform during a write operation to counteract or oppose the magnetic write field from the writer 206 in the proximity of reader 208. More specifically, during a writing operation, a read bias current waveform is applied to coil 220. In one specific example, the read bias waveform is a function of the write current wave form applied to writer 206. In the configuration of FIG. 2, the flux pipe 216 increases the efficiency of the magnetic coupling between the magnetic field generated by coil 220 and free layer 214 of reader 208. The magnetic waveform generated by coil 220 may be such that it has an effective field on the free layer 214 which cancels the effective field generated from writer 206 due to magnetic cross talk. The particular biasing waveform can be generated through calculations, or measured imperially. For example, an initial training period can be employed to identify the cross talk between the read and write structures. In another example, a trainer circuit (implanted in controller 304 shown in FIG. 9) can be used to measure the cross talk sensed by the reader 208.

The generation of the reader biasing waveform can be performed by circuitry based upon the write signal applied to the writer 206. In some embodiments, the signal can be generated by circuitry located on the slider transducer 200 (for example using active devices and integrated circuits). In another example configuration, an additional sensor (309 in FIG. 9) is employed in the vicinity of the write yolk or the write coil to detect the magnetic field from the writer and to generate a corresponding cancellation read bias signal. However, this configuration requires an additional sensor 309 and sufficient delay between detection of the write signal and generation of the reader bias signal.

Figure 3:
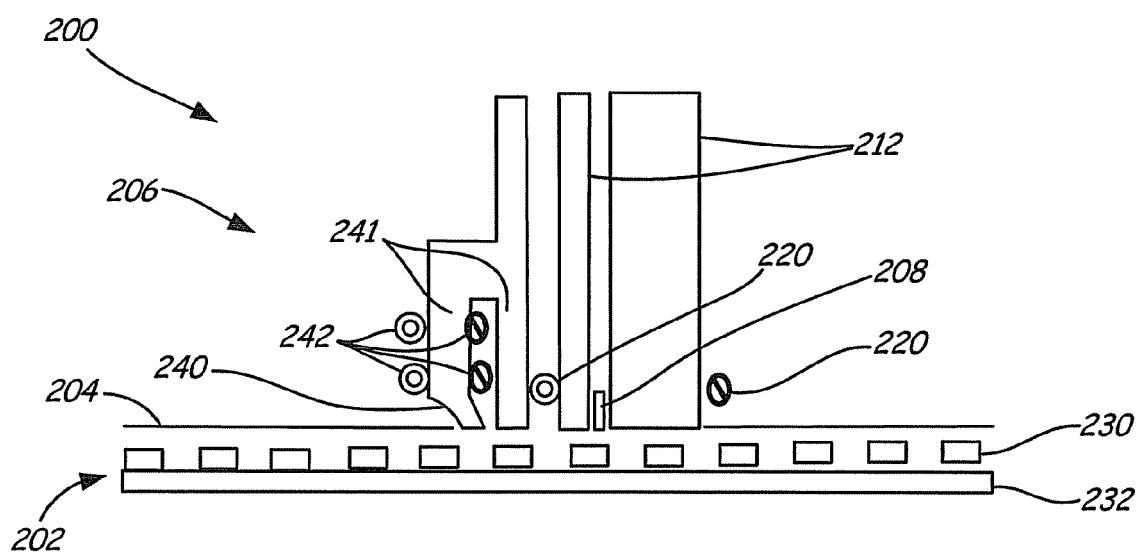
FIG. 3 is a side cross-sectional view which shows a side view of another example embodiment of the present invention including a bias coil arranged in parallel with storage medium.

FIG. 3 shows another example embodiment of the present invention and in greater detail than that shown in FIG. 2. In FIG. 3, the storage media 202 is illustrated as including a bit pattern media data layer 230 carried on a soft under layer (SUL) 232. Writer 206 is formed by upper and lower pole pieces 241 which provide pole tips 240. A writer coil 242 is wrapped therebetween. When a write current is provided through writer coil 242, magnetic flux is caused to emanate between pole tips 240 and into the bit pattern media data layer 230.

In the configuration of FIG. 3, the reader bias coil 220 is positioned around reader shields 212. As discussed above, during a write operation, flux from the writer 206 can cause read transducer 208 to enter saturation. For example, the magnetic flux from the writing operation can be coupled along the soft under layer 232 and read shield 212 into the read transducer 208. An opposing bias field is generated by bias coil 220 to prevent the read transducer 208 from moving into saturation or otherwise maintaining the reader in a linear, or weakly non-linear regime.

Figure 4:
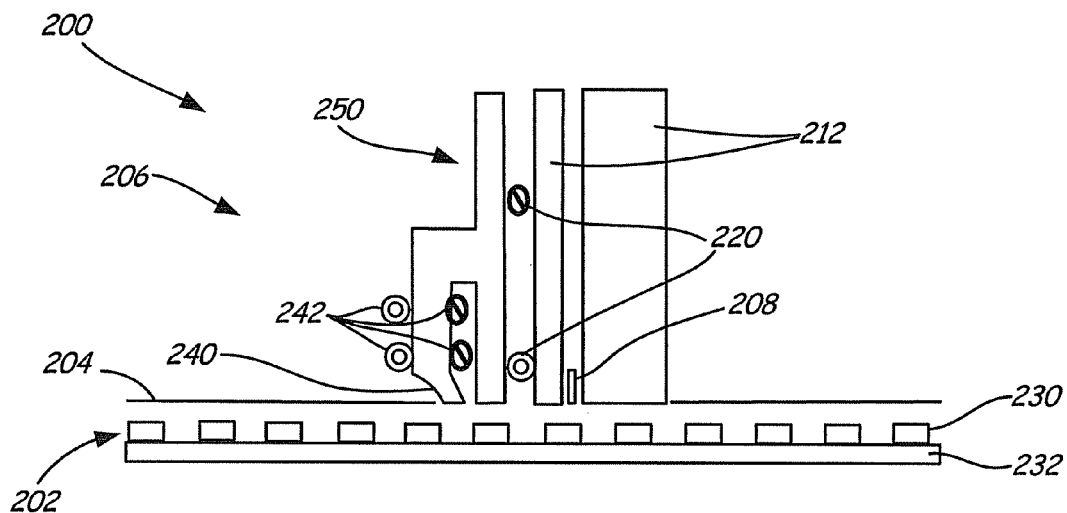
FIG. 4 is a side cross-sectional view which shows another example embodiment in which the bias coil is arranged perpendicular to the storage medium.
Figure 5:
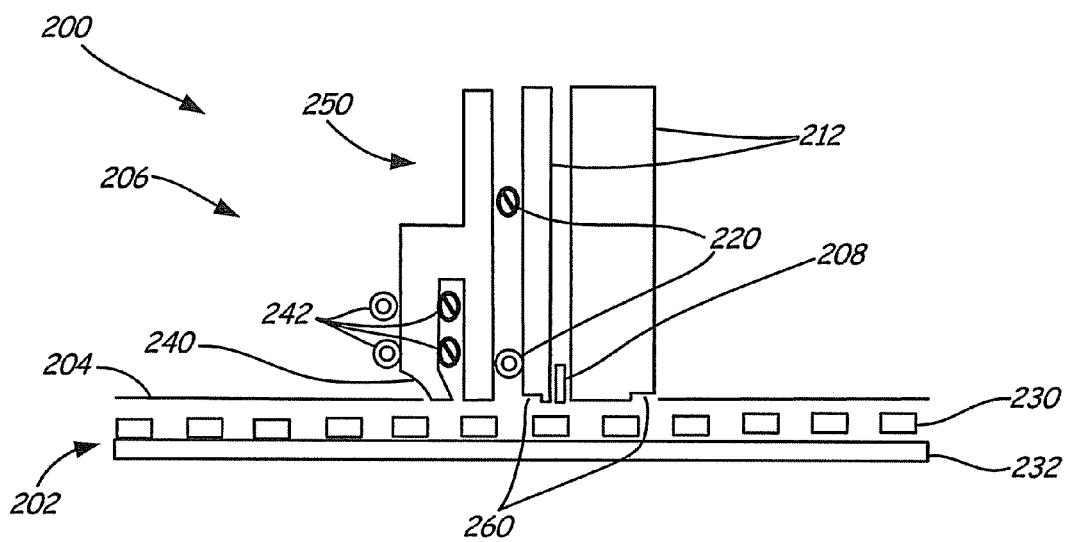
FIG. 5 is a side cross-sectional view which shows a view of another example embodiment in which the reader shields have recesses.

In the above examples, the bias coil 220 is illustrated as lying parallel with the plane of the storage media. However, FIG. 4 shows another example embodiment in which the bias coil 220 is positioned perpendicular to the plane of the storage medium 202 in a "pancake" configuration. In this configuration, the coil 220 is positioned between one of the read shields 212 and a writer flux return layer 250. FIG. 5 shows another example embodiment in which the read shields 212 include shield recesses 260. Such a configuration can be utilized in order to reduce the sharp outer edges along a shield 212 such that they are receded from the media 202. This prevents excess magnetic fields at these edges from demagnetizing the data stored on the media 212.

Figure 6:
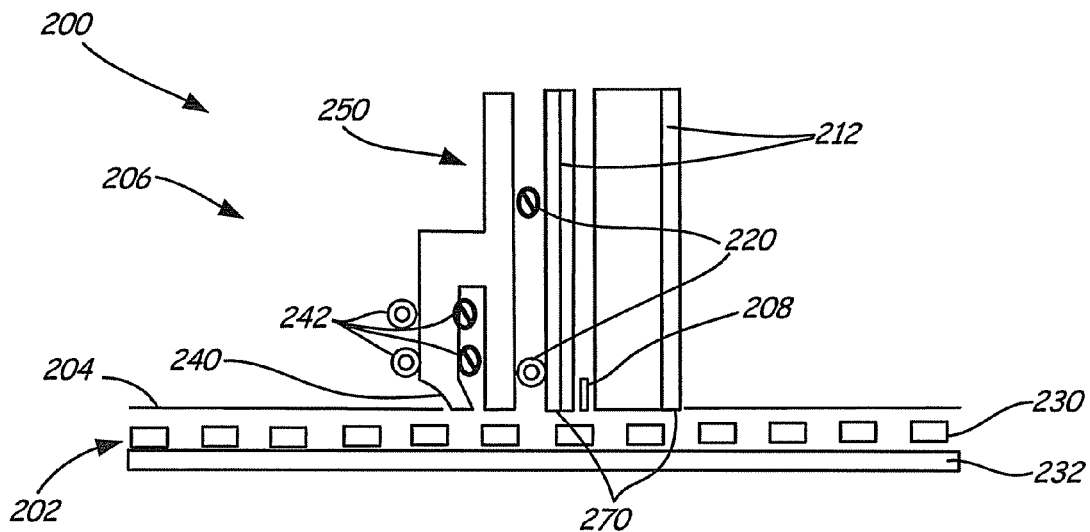
FIG. 6 is a side cross-sectional view which shows an example embodiment in which layers having a graded magnetic saturation level are positioned adjacent the reader shield.
Figure 7:
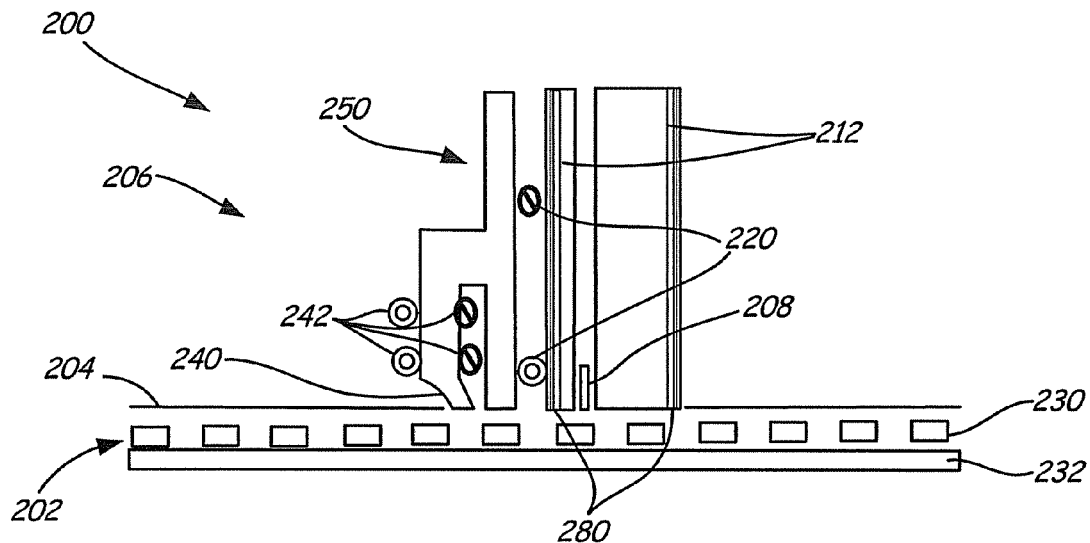
FIG. 7 is a side cross-sectional view which shows an example embodiment in which laminated layers are positioned above and below the reader shield.

FIG. 6 shows another example configuration in which the saturation magnetization of the outer surfaces of the read shield 212 are reduced to a low value by grading the density of the magnetic layers with a lower saturation magnetization layer 270. The additional layers 270 have substantially reduced magnetization saturation in comparison to the reader shields 212. FIG. 7 shows a similar configuration in which laminated layers 280 are provided adjacent read shields 212 having a graded density to thereby reduce any erase fields emanating from the edges of reader shields 212. The lamination of ferromagnetic layers with non-ferromagnetic layers can be used to provide the low saturation magnetization layer 270.

Figure 8:
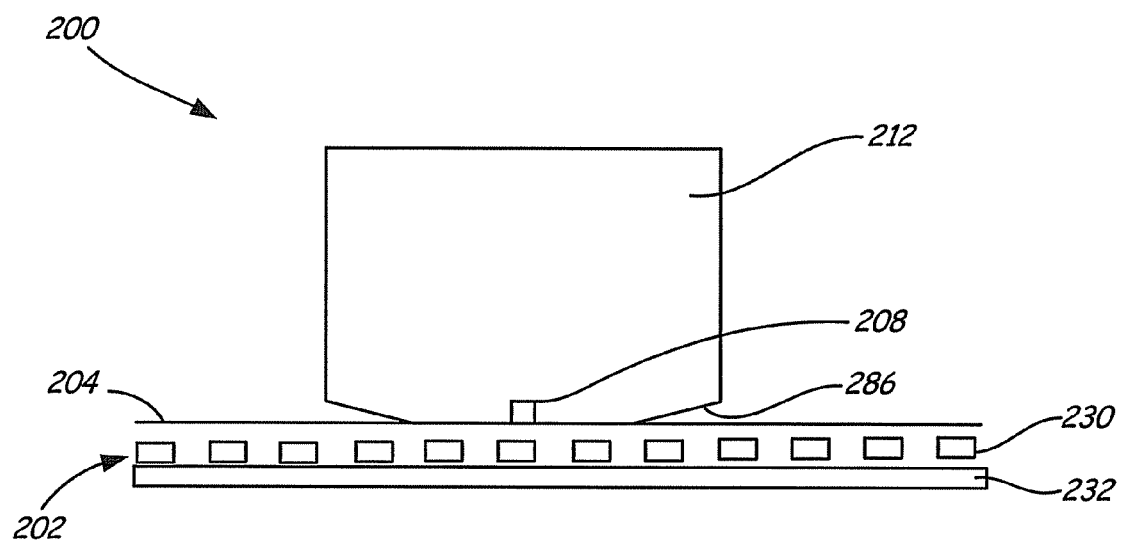
FIG. 8 is a side cross-sectional view of a configuration in which the reader shield has beveled edges.

FIG. 8 shows yet another embodiment in which the edges of the reader shield 212 have a bevel 286 to reduce erase fields emanating from the corners of reader shield 212. Such a configuration is also used to minimize erase fields originating from external fields.

Figure 9:
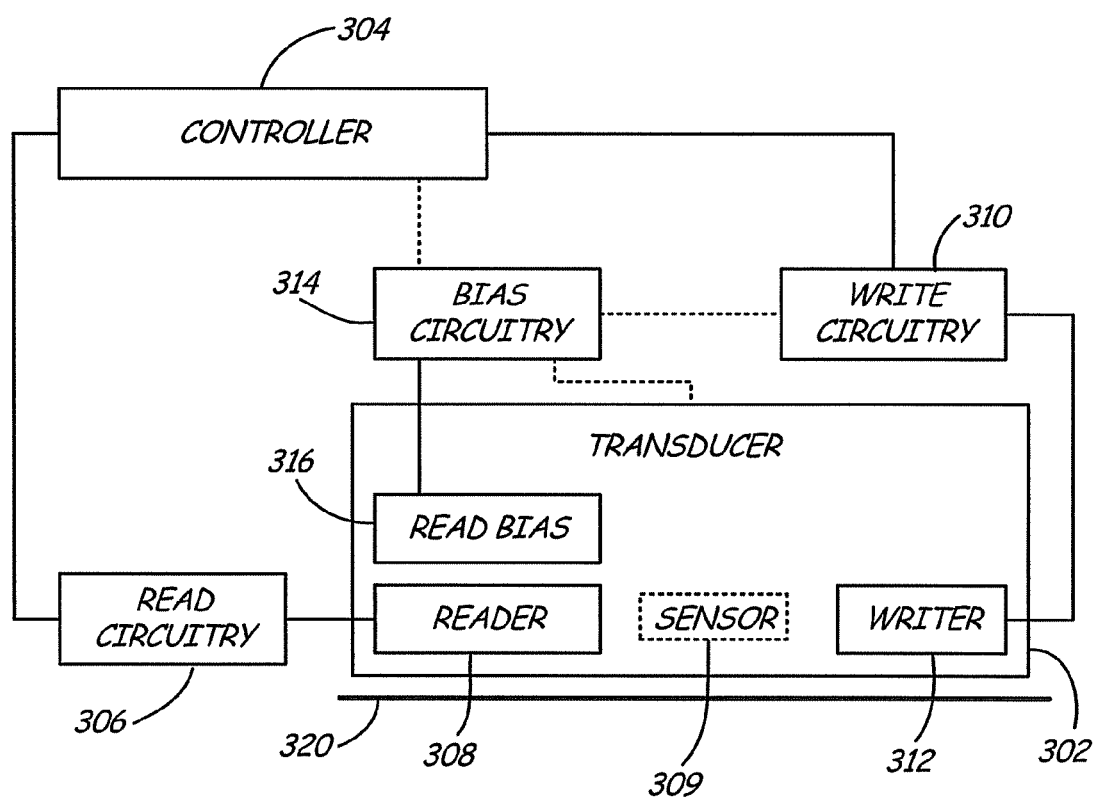
FIG. 9 is a block diagram showing circuitry coupled to a transducer including a read bias coil.

FIG. 9 is a simplified block diagram showing a recording system 300 arranged for recording data on storage medium 320. System 300 includes a transducer head 302. A controller 304 is configured to receive read data from read circuitry 306 which couples to a reader 308. Controller 304 also couples to write circuitry 310 for writing data on the media 320 using writer 312. Bias circuitry 314 couples to a read bias coil 316 which is arranged as discussed above. Bias circuitry 314 can operate in accordance with any desired configuration. In one example, read bias circuitry 314 operates as a function of the write signal applied by write circuitry 310. In another example configuration, bias circuitry operates based upon a signal provided by controller 304. The signal from controller 304 can be based upon stored data or from other sources, including based upon the signal provided to the write circuitry 310 based upon the signal received from read circuitry 306, from a signal from sensor 309, or from other circuitry based upon the data being written, etc.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. Although the present invention has been described with reference to preferred embodiments, workers skilled in the art will recognize that changes may be made in form and detail without departing from the spirit and scope of the invention. By compensating for the effects of the writer field directly, it is not necessary that additional circuitry be used to electronically compensate the read signal and also avoids problems associated with the reader entering saturation.

What is claimed is:

1. A magnetic storage system comprising:
   a magnetic storage medium;
   a transducer that communicates with the magnetic storage medium, the transducer having a reader adjacent a writer, and a reader bias coil; and
   circuitry configured to apply a write signal to the writer and a reader bias signal, which is related to a waveform of the write signal, to the reader bias coil during a performance of a read operation while writing data.

2. The system of claim 1 wherein the transducer includes a read shield and the reader bias coil is positioned between the read shield and the reader.

3. The system of claim 1 wherein the magnetic storage medium comprises a bit patterned media.

4. The system of claim 1 wherein the circuitry is configured to apply the write signal to the writer while reading information from the magnetic storage medium using the reader.

5. The system of claim 1 wherein the transducer includes a reader shield and the reader bias coil is positioned between the reader shield and the writer.

6. The system of claim 1 wherein the reader bias coil extends in a plane which is generally parallel with a plane of the magnetic storage medium.

7. The system of claim 1 wherein the reader bias coil extends in a plane which is generally perpendicular with a plane of the magnetic storage medium.

8. The system of claim 1 wherein the transducer includes a read shield adjacent the reader and wherein the read shield includes a recessed outer edge proximate the magnetic storage medium to reduce a demagnetization field applied to the magnetic storage medium.

9. The system of claim 1 wherein the transducer includes a read shield positioned adjacent the reader and a layer adjacent the read shield configured to reduce a demagnetization field emanating from the read shield.

10. The system of claim 9 wherein the layer comprises a material having a reduced saturation magnetization value.

11. The system of claim 9 wherein the layer comprises layers of magnetic and non-magnetic layers.

12. The system of claim 1 including a read shield positioned adjacent the reader and wherein the read shield includes a beveled edge to reduce an erase field applied to the magnetic storage medium.

13. The system of claim 1 wherein the transducer includes a write field sensor arranged to sense a write field emanating from the writer.

14. The system of claim 13 wherein the reader bias signal is a function of an output from the write field sensor.

15. The system of claim 1 wherein the reader bias signal is a function of data being written by the writer.

16. A method of writing data to a magnetic storage medium, comprising:
applying a write signal to a writer of a transducer and generating a write field applied to the storage medium, the writer positioned proximate a reader of the transducer;
applying a reader bias signal, which is related to a waveform of the write signal, to a reader bias coil, the reader bias coil positioned proximate a reader of the transducer and producing a bias magnetic field which opposes the write field proximate the reader; and
reading data from the storage medium with the reader while writing data to the storage medium with the writer.

17. The method of claim 16 wherein the reader bias signal is a function of data being written by the writer.

18. The method of claim 16 including reducing a demagnetization field applied to the magnetic storage medium from the reader bias coil.

19. An apparatus comprising:
a transducer comprising:
a reader;
a writer; and
a reader bias coil; and
circuitry configured to apply a write signal to the writer and a reader bias signal, which is related to a waveform of the write signal, to the reader bias coil during a performance of a read operation while writing data.

20. The apparatus of claim 19 wherein the transducer includes a reader shield and the reader bias coil is positioned between the reader shield and the writer.

* * * * *